Patented Oct. 13, 1925.

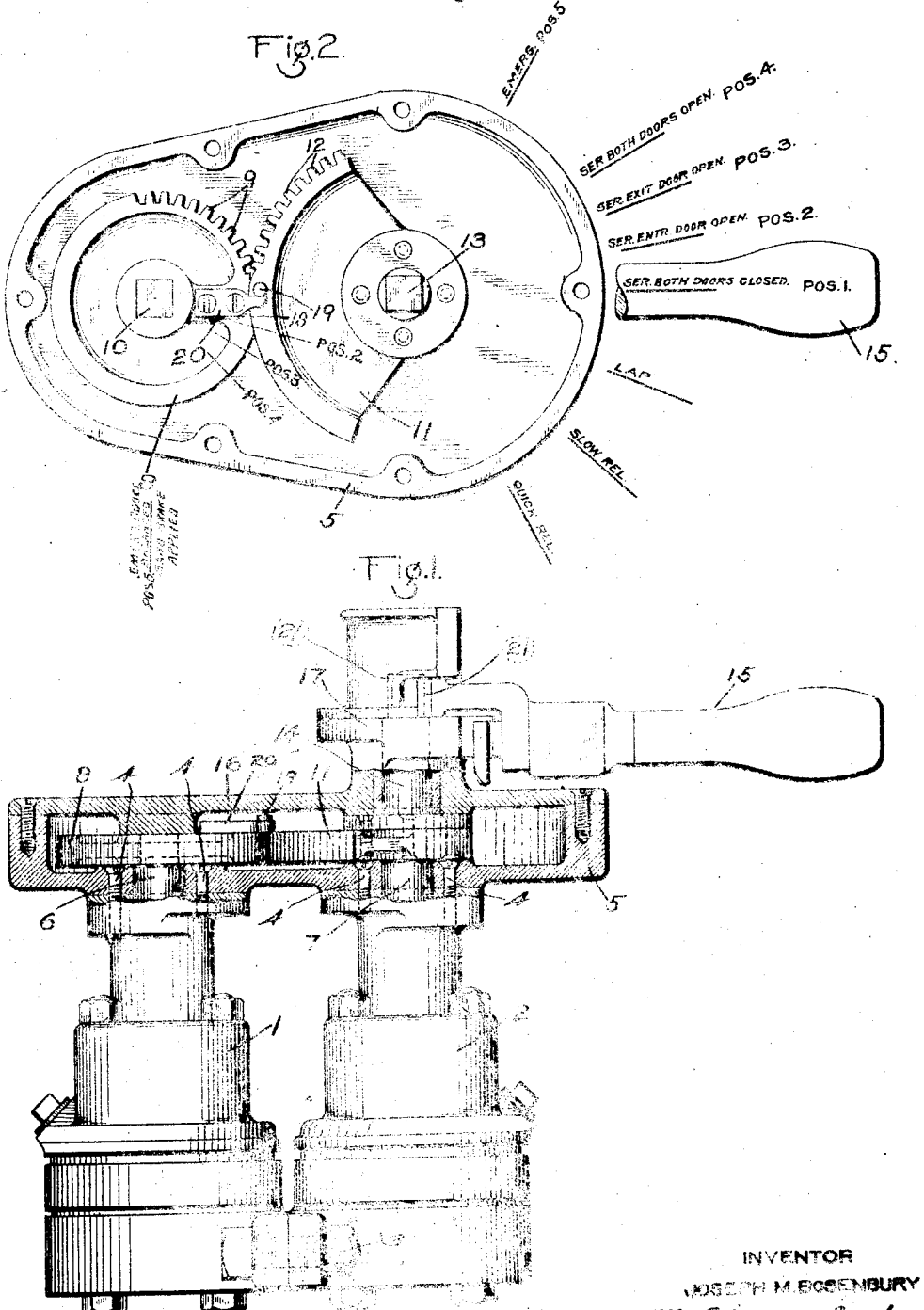

1,556,583

UNITED STATES PATENT OFFICE.

JOSEPH M. BOSENBURY, OF PEORIA, ILLINOIS.

BRAKE AND DOOR CONTROL DEVICE.

Application filed August 29, 1923. Serial No. 659,939.

*To all whom it may concern:*

Be it known that I, JOSEPH M. BOSENBURY, a citizen of the United States, residing at Peoria, in the county of Peoria and State of Illinois, have invented new and useful Improvements in Brake and Door Control Devices, of which the following is a specification.

This invention relates to car door, step, and brake controlling devices, and more particularly to a construction in which one manually controlled valve device controls the fluid pressure for operating the car doors and steps and another manually controlled valve device controls the fluid pressure brakes.

The principal object of my invention is to provide means whereby the functioning of two valves of the above character is interlocked in a desired manner.

In the accompanying drawing; Fig. 1 is an elevational view, partly in section, of two valve devices for controlling the car doors, steps, and brakes, with my improvement applied thereto; and Fig. 2 a plan view of the construction shown in Fig. 1, with the cover plate removed.

As shown in the drawing, a manually operated valve device 1 for controlling the car doors and steps and a manually operated valve device 2 for controlling the fluid pressure brakes are secured together as by bolts 3. Secured to the tops of the valve devices 1 and 2 by bolts 4 is a casing or housing 5, the usual valve stems or spindles 6 and 7 of the respective valve devices extending through apertures in the casing 5.

A gear member 8 having a sector provided with gear teeth 9 is applied to the usual squared end 10 of the spindle 6 and a gear member 11 having a sector provided with gear teeth 12 is applied to the usual squared end 13 of spindle 7.

Secured to the upper face of the gear member 11 is an extension spindle 14 having a squared end 21 for receiving the usual brake valve handle 15. A cover plate 16 is secured to the top face of the casing 5 and is provided with a brake valve handle receiving portion 17, similar to that usually employed for receiving the brake valve handle in connection with the usual brake valve device.

In the position of parts as shown in Fig. 1, the gear teeth 9 and 12 are just out of mesh, and the outer circular face of the gear member 11 engages a concave depression 18 in the tooth face of the gear member 8, so that the gear member 11 may be rotated in a clockwise direction from the position shown in Fig. 2, without rotating the gear member 8.

In order to ensure the meshing of the teeth 9 and 12 when the handle 15 is turned in a counter clockwise direction from the position shown in Fig. 2, a pin 19 is secured to the gear member 11 so as to engage in this position with a finger 20 secured to the gear member 8. It will be evident that when the handle 15 is operated to rotate the gear member 11 in a counter clockwise direction, the pin 19 will act on the finger 20 to effect the rotation of the gear member 8 until the gear teeth 9 and 12 mesh.

In operation, by manipulation of a single handle 15, the brakes on the vehicle may be applied and released and the car doors may be opened and closed as desired.

While various operating relations between the car doors and the brakes may be provided, in the drawing I have illustrated an arrangement in which the door controlling valve device 1 is adapted to control a car entrance door and a car exit door. In position 1, the valve device 1 is adapted to effect the closing of both the entrance and the exit doors. In position 2, the entrance door is opened while the exit door remains closed. In position 3, the exit door is opened while the entrance door remains closed. In position 4, both the entrance and exit doors are opened, and in position 5, doors are balanced, so that they can be opened manually.

In the corresponding positions 1 to 4 inclusive of the operating handle 15, the valve device 2 is adapted to effect a service application of the brakes, so that when the handle 15 is moved to any one of positions 1, 2, 3, and 4, the meshing of the gear teeth 9 and 12 causes a movement of the gear member 8, so that the valve device 1 is operated to control the car doors as hereinbefore described, while at the same time the brakes are applied to effect a service application of the brakes by operation of the valve device 2. If the handle 15 is moved to position 5, an emergency application of the brakes is effected by operation of the valve device 2 while in the corresponding position 5 of the valve device 1, the entrance and exit doors are balanced, so that both doors can be manually opened, if desired.

To effect the release of the brakes, the handle 15 is moved in a clockwise direction from the position shown in Fig. 2 and it will be noted that this movement is effected without rotating the gear member 8, since the gear teeth are out of mesh in this position and since the gear member 11 is free to slide in the concavity 18 of the gear member 8.

It will be obvious that any number and arrangement of valve movements may be obtained by varying the intermittent operation of the gear members as desired.

Having now described my invention, what I claim as new and desire to secure by Letters Patent, is:—

1. The combination with associated valve devices, one for controlling the car doors and the other for controlling the car brakes, of a handle for operating one valve device and an operating connection between said valve devices for operating the other valve device upon movement of said handle to certain positions, said connection being inoperative upon movement of the handle to other positions.

2. The combination with associated valve devices, one for controlling the car doors and the other for controlling the car brakes, each valve device having a rotatable valve stem, of a handle for rotating one valve stem and gear members operatively connecting said valve stems and having sectors provided with gear teeth adapted to mesh through a portion only of the operating arc of said handle.

3. The combination with associated valve devices, one for controlling the car doors and the other for controlling the car brakes, each valve device having a rotatable valve stem, of a handle for rotating one valve stem and gear members operatively connecting said valve stems and having sectors provided with gear teeth adapted to mesh upon movement of said handle through one portion of its operating arc and to be disengaged upon movement of the handle through another portion of its operating arc.

4. The combination with associated valve devices, one for controlling the car doors and the other for controlling the car brakes, of a handle for operating one of said valve devices and a gear connection between said valve devices for operating the other valve device through a portion of the movement of said handle whereby the doors may be opened or closed by the movement of one valve device while the brakes are applied by the movement of the other valve device.

5. The combination with associated valve devices, one for controlling the car doors and having positions for opening one car door, for opening another car door, and for opening both car doors and the other valve device for controlling the brakes, of a handle and a geared connection between said valve devices whereby upon operation of one valve device by said handle, the brakes are applied while the other valve device is in its enumerated positions.

6. The combination with associated valve devices, one for controlling the car doors and the other valve device for controlling the brakes, of a handle for operating one of said valve devices and a mechanical connection between said valve devices for effecting the operation of one valve device to open the car doors while the brakes are applied by the operation of the other valve device, and means for disconnecting said mechanical connection upon movement of one valve device to release the brakes while the other valve device remains in position to close the car doors.

In testimony whereof I have hereunto set my hand.

JOSEPH M. BOSENBURY.